Jan. 19, 1965      B. N. HOFFSTROM      3,165,893
FLUID COUPLINGS
Filed Jan. 2, 1962      2 Sheets-Sheet 2
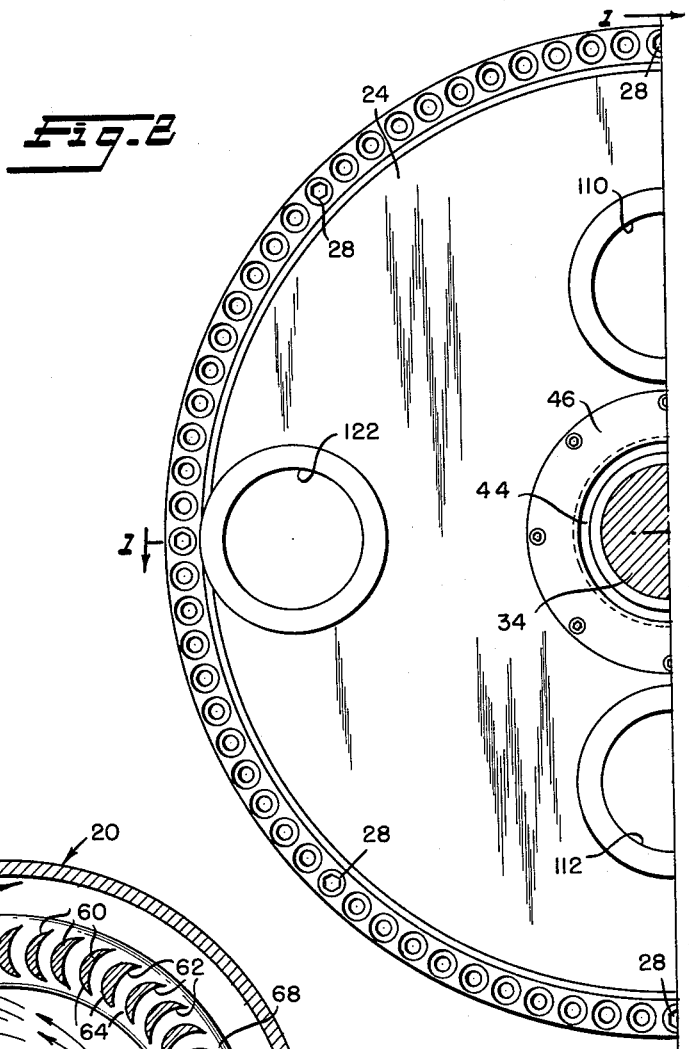
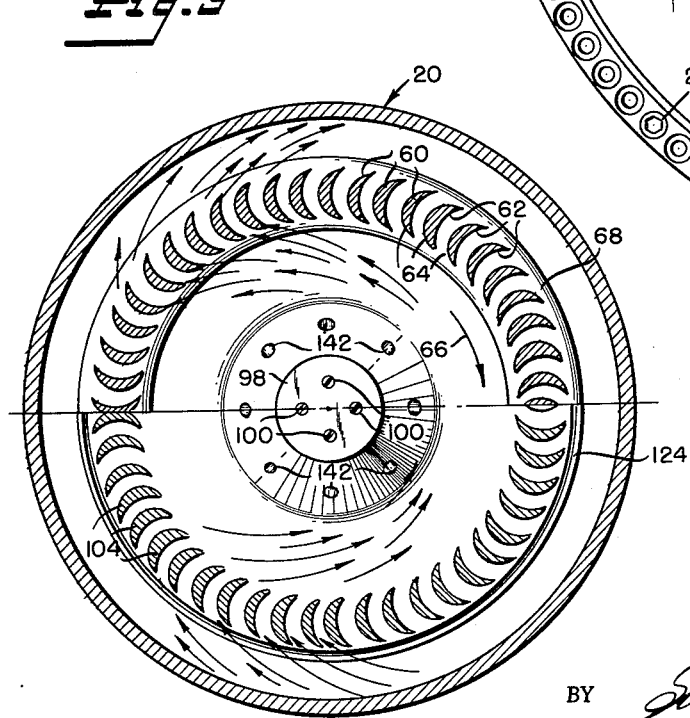
INVENTOR
Bo N. Hoffstrom
BY *Strauch, Nolan & Neale*
ATTORNEYS

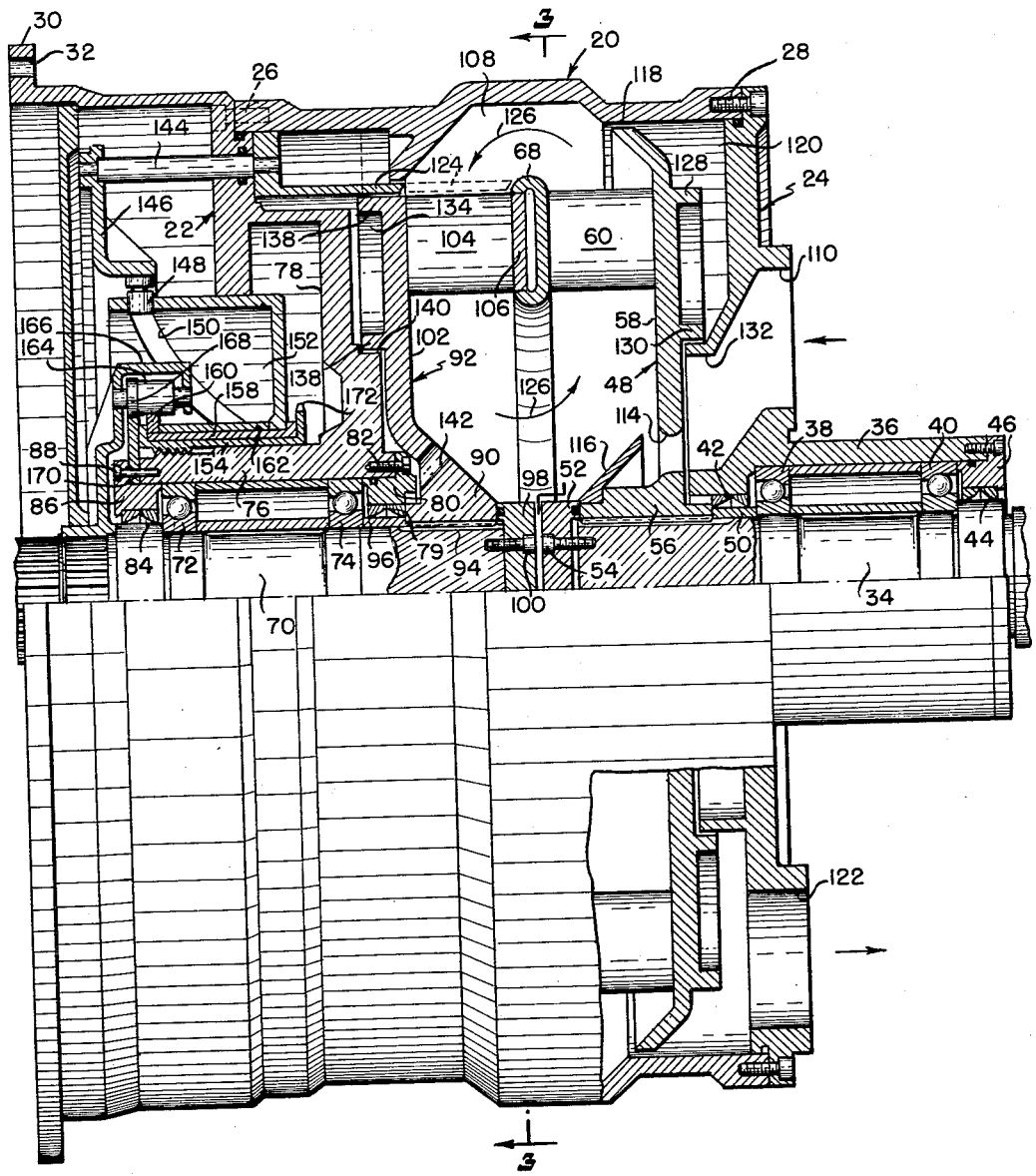

United States Patent Office 3,165,893
Patented Jan. 19, 1965

3,165,893
FLUID COUPLINGS
Bo N. Hoffstrom, Los Angeles, Calif., assignor to Douglas Aircraft Company, Inc., Santa Monica, Calif.
Filed Jan. 2, 1962, Ser. No. 163,778
3 Claims. (Cl. 60—54)

This invention relates to fluid couplings and more particularly to such couplings which are especially suited for efficient operation at relatively high torque values.

In the past, variable torque transmission devices particularly those suitable for the transmission of high torque values have been of the eddy current type or have been fluid couplings of the so-called Froude design, the latter generating a "smoke ring" vortex within a housing in which the input and output members rotate. Each of these types of units have serious limitations. The eddy current unit coupling for example is extremely large, heavy and costly which severely restricts its utility and application.

The prior fluid couplings established a flow and pressure pattern which rendered cavitation unavoidable. Also the capacity of such fluid couplings is usually controlled by regulation of the amount of fluid within the coupling housing. This method of control is not precise and does not lend itself to rapid variation.

With these considerations in mind, it is the principal purpose and object of the present invention to provide improved fluid couplings which are efficient, fully controllable, mechanically simple, compact and light-weight and relatively inexpensive.

It is a further object of the invention to provide improved fluid couplings which can be controlled readily, either manually or in response to any desired parameters to deliver any desired output torque or any speed ratio.

It is also an object of the present invention to provide improved fluid couplings which are free from cavitation under all operating conditions, in which water may be used as the working medium.

It is an additional object of the present invention to provide improved fluid couplings in which heat dissipation is effected by permitting through flow of the water or other working medium to permit the working fluid itself to carry heat away from the mechanism.

In attaining these and other objects, the present invention provides fluid couplings comprising a housing forming a toroidal working chamber in which a set of impeller blades driven by an input shaft and a set of turbine blades driving an output shaft rotate. The impeller and turbine blades are positioned at the same radial distance from the axis of the apparatus and are separated by a divider ring, the disposition of the blades, the ring and the working chamber being such that the fluid in the chamber is caused to flow in an intense vortex pattern. The main velocity component of the working medium is tangential with limited circulation, radially and axially, of the fluid around the divider ring. The pressure gradient inherent in such a flow pattern prevents cavitation under all operating conditions because the static pressure exceeds the velocity head and vapor pressure at the radius where the blades are located. The capacity of the unit can be readily controlled by a throttle ring which regulates the flow of the working medium around the divider ring between the impeller and turbine blades.

Additional objects and advantages will become apparent as the description proceeds in connection with the accompanying drawings in which:

FIGURE 1 is a side elevation of a fluid coupling constructed in accordance with the present invention with a portion of the coupling being shown in central section essentially along line 1—1 of FIGURE 2;

FIGURE 2 is a fragmentary end elevation of the coupling of FIGURE 1; and

FIGURE 3 is a transverse section taken along line 3—3 of FIGURE 1.

While the fluid couplings of the present invention are of wide utility and broad application and operate successfully in a wide range of sizes, for present purposes the fluid coupling shown in the drawings for illustrative purposes is of a relatively large size and specifically adapted for use as a principal component of an aircraft launching system. In this form the unit has an over-all diameter of approximately 47", an over-all length of approximately 42" and has a design torque capacity of approximately 300,000 ft. lbs., at an input speed of 1500 r.p.m. and an output speed of 1400 r.p.m.

The principal components of the fluid coupling of the present invention are enclosed in an annular shell-like housing member indicated generally at 20 to which end plate assemblies 22 and 24 are secured by a plurality of bolts 26 and 28, respectively. The end plate assembly 22 has a mounting flange 30 provided with a ring of bolt holes 32 to permit attachment of the entire assembly to a rigid mount not shown which may be of any desired design to accommodate the needs of a particular installation.

An input shaft 34, adapted to be driven by any suitable source of power, is supported for rotation within an axial boss 36 formed integrally with end plate assembly 24 by sets of bearings 38 and 40, a suitable sealing assembly 42 being provided at the inboard side of the bearing assemblies and seal 44 being provided at the outboard side of the bearings carried by a plate 46 suitably secured to the outer end of the boss 36. Nonrotatably secured to the inner end of the input shaft 34 is a rotor assembly indicated generally at 48 which is clamped against a spacer 50 by a cap 52 detachably secured by bolts 54 to the inner end of the input shaft 34. The rotor assembly 48 includes a hub portion 56 keyed to the input shaft 34 and a generally radially extending plate section 58 on which a plurality of crescent-shaped impeller blades 60 are cast or machined. As is best shown in FIGURE 3 each of the impeller blades is of crescent shape in section and has a forwardly facing arcuate surface 62 and a rearwardly facing arcute surface 64 which forms a channel with the arcuate surface 62 on the next adjacent impeller blade 60 when the input shaft is rotated in the direction of arrow 66 as is more fully explained below. The ends of the impeller blades 60 remote from the plate 58 are cemented or otherwise suitably secured to an annular divider ring 68, the purpose of which will be more fully explained below.

The output shaft 70, which is generally similar to the input shaft 34, is rotatably supported by spaced bearing sets 72 and 74 mounted within an axially extending boss 76 formed at the inner end of a radial plate-like section 78 of the end plate assembly 22. An inboard seal 79 is carried by a plate 80 secured by bolts 82 to the inner end of the boss 76 while an outboard seal 84 is carried by a plate 86 secured by bolts 88 to the outer end of the boss 76.

Hub portion 90 of the turbine rotor assembly 92 is keyed as at 94 to the inboard end of the output shaft 70 and is clamped against a spacer 96 by a cap 98 secured by bolts 100 to the inner end of the the output shaft 70.

Cast or machined as part of a radial plate-like section 102 of the rotor 92 is a plurality of turbine blades 104 which are of the same configuration as the impeller blades 60 but which face in the opposite direction as best shown in FIGURE 3. The outer ends of the turbine blades are cemented or otherwise secured to a ring 106 which is received with a close clearance fit in a corresponding recess in the ring 68. The rings 106 and 68 cooperate to provide a smooth walled annular divider located in an axially centered position in an annular working chamber 108 formed by a wall of the housing 20 and the radial sections 102 and 58 of the respective rotors.

The working chamber 108 is filled with water which, as stated above, can be used as the working fluid since the flow pattern and the pressure gradient established by the apparatus of the present invention is such as to prevent cavitation. The heat generated in operation of the apparatus is dissipated by providing for a through flow of water. Water from a suitable pressure source for example 25 p.s.i. and capable of producing a flow of 4,000 gallons a minute is delivered to the unit through symmetrically disposed upper and lower inlet openings 110 and 112 formed integrally with the end plate assembly 24. Water flows into the working chamber through a series of inlet ports 114 in the rotor plate 58. An annular conical shield 116 carried by the hub portion of the rotor assembly 48 is provided to shield the water flowing in through the ports 114 from the velocity head of the water within the working chamber 108.

The water leaves the working chamber through an annular space 118 at the rim of the rotor assembly 48, enters an annular chamber 120 formed between the rotor assembly 48, and end plate 24 and passes through a pair of opposed outlet openings 122 (one shown) formed in the end plate 24.

The effective capacity of the device is controlled by an annular throttle ring 124 movable between a full open position shown in full lines in a fully closed position shown in dotted line, the forward lip of the throttle being closely adjacent to the outer rim of divider ring 68 in the latter position to substantially completely block the flow around the divider ring and thus block the path of fluid communication between the impeller blades 60 and the turbine blades 104.

In operation assuming that the input shaft is driven in a clockwise direction as viewed in FIGURE 3 the impeller blades 60 intercept a portion of the water which substantially fills the working chamber 108 and drives the intercepted body of water tangentially of the chamber with a velocity which soon becomes substantially greater than the velocity of the impeller blades. As the rotation of the blades progresses a vortex is formed with a core and a steep pressure gradient is established between the center of the vortex rising to a maximum value at the outer surface or rim of the working chamber 108. When the throttle ring 124 is open a portion of the fluid is caused to follow the path indicated by the arrow 126 so that the water flows into the region of the turbine blades and is intercepted by these blades. The direction of flow of the water is changed by the turbine as it flows inwardly of the divider ring 68 into the region of the impeller blades where its direction and velocity are again changed. Each time the water passes the impeller blades 60 its tangential velocity is increased by an amount proportional to the rotary speed of the blades. The rotary velocity of the fluid and thus volume flow rapidly increases until the velocity gain in the impeller circuit is exactly offset by velocity loss in the turbine blades and frictional losses. Throughout the operating cycle the tangential velocity of the water is many times higher than the velocity in the direction of the arrows 126.

In the fluid coupling of the present invention advantage has been taken of the radial pressure gradient inherent in the vortex flow established in the working chamber to prevent cavitation which would occur if the velocity head were permitted to exceed the difference between the local static fluid pressure and the vapor pressure of the liquid at the prevailing temperature. Since in a vortex static pressure increases with the radius from the center of the vortex while the velocity head decreases there is, in any vortex, a radius beyond which cavitation cannot occur. The impeller blades and the turbine blades are placed outwardly of this critical radius and operate there without any danger of cavitation.

During the operation of the unit the two rotor assemblies are balanced against axially directed forces. For example with respect to the rotor assembly 48 the pressure in the chamber 120 substantially equals the pressure at the opposite side of the rotor assembly in the working chamber. The inner of two stiffening rings 128 and 130 is in close clearance relation with a lip 132 on the end plate 24 to provide for a controlled bleed from the high pressure area in chamber 120 toward the low pressure area in the region of the water inlet 110. The turbine rotor is similarly balanced by permitting a small amount of the high pressure fluid in the region adjacent the outer rim of the rotor to bleed past the throttle ring into a chamber 134 at the outer or left side of the rotor assembly 92. Again, the inner of two stiffening rings 136 and 138 is in close clearance relation with a cylindrical surface 140 on the plate 78 to provide a flow restriction to maintain the pressure in chamber 134. The water being bled through the restriction at the surface 140 passes inwardly and returns to the working chamber through a plurality of openings 142 in the hub section 90 of the rotor assembly 92.

The heat generated during operation of the unit may be dissipated by furnishing a continuous supply of cool water or by a suitable evaporator or heat exchanger in a closed water circuit. A suitable arrangement of this type is shown for example in co-pending application Serial No. 122,307, filed June 6, 1961, now Patent No. 3,093,-352, issued June 11, 1963, for power absorbing systems and components.

The position of throttle ring 124 may be controlled manually, hydraulically, or by any desired mechanical means. For purposes of illustration an automatic mechanical control is shown which is particularly adapted for moving the throttle in a programmed manner during a relatively few revolutions of the unit, a type of control which is particularly useful when the fluid coupling is used as a part of a system such as an aircraft launching system in which the launching operation is effected in a very brief time and the fluid coupling is operated to provide essentially constant force.

For this purpose an automatic cam operated throttle control is employed. The throttle 124 is connected by a plurality of rods 144 slidably carried by the end plate assembly 122 to a ring 146 which carries a plurality of cam followers 148 (one shown) received in cam tracks 150 in a cup-shaped cam member 152. Boss 76 of the end plate 78 assembly 22 carries an adjusting sleeve 154 which in turn supports a mounting sleeve 158. The inner edge of the cam member 152 is clamped between the upturned end of the sleeve 158 and a spacer 162, the opposite end of which clamps a ring 160 in place. The ring 160 constitutes one sun member of a differential planetary system and it is engaged by a plurality of planet rollers 164 (one shown) rotatably supported by a ring 166 splined onto or otherwise rotatable with the output shaft 70. A relatively enlarged portion 168 of the planet members 164 engages a fixed ring 170 secured by the bolts 88 to the end of the hub portion 76 of the end plate assembly 22. Thus as the output shaft rotates and carries the planet members around the ring 170, the ring 160 is also caused to rotate at a very slow speed carrying with it the cam member 152 which moves the control ring 146 and throttle 124 axially. The gear ratio can be chosen to move the throttle a full stroke in any given number of turns of the output shaft for example 100 revolutions and the cam contour can be programmed to give any desired torque vs. speed curve.

The initial setting of the unit can be regulated by rotation of the sleeve 154 for example by providing a sprocket as illustrated at 172 which may be actuated manually by a chain drive system not shown. The sleeve 154 is in threaded engagement with the hub portion 76, and as it turns it moves axially carrying the entire cam assembly 152 and thus adjusts the cam curves 150 in throttle closing direction. Alternate forms of control for the throttle ring 124 are disclosed in the aforesaid co-pending application Serial No. 122,307 (Patent No. 3,093,352) or application 44,057 filed July 20, 1960, now Patent No. 3,122,220, issued February 25, 1964, for Brake Systems. Instead of surrounding the turbine the throttle 124 may be arranged around the impeller. This arrangement will give slightly reduced impeller drag when the throttle is closed.

The invention may be embodied in other specific forms without departing from the spirit or essential characteristics thereof. For example, either the impeller blades or the turbine blades may be rigid with the housing which is then permitted to rotate and function either as the input or output member. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid coupling comprising a housing forming the outer periphery of a toroidal working chamber adapted to be substantially filled with fluid, a pair of spaced radial wall members forming the sides of said chamber, one of said wall members being connected to an input shaft and the other of said wall members being connected to an output shaft, a series of impeller blades carried by said one wall member for rotation in said working chamber adjacent the outer periphery thereof, a series of turbine blades carried by the other radial wall member for rotation in said working chamber adjacent the outer periphery thereof and opposite said impeller blades, means providing a radially extending divider ring between the adjacent inner ends of said impeller blades and said turbine blades, said divider ring extending radially inwardly and radially outwardly of said turbine blades and said impeller blades, each of said impeller blades having an arcuate surface facing in the direction of rotation of said input shaft and each of said turbine blades having an oppositely directed face whereby upon rotation of said impeller blades said fluid in said working chamber is caused to rotate circumferentially in said working chamber, said rotating body of fluid impinging on said turbine blades to drive said turbine blades and said output shaft, means providing fluid openings in said housing communicating with the inner periphery of said chamber, means forming outlet openings in said housing communicating with the outer periphery of said chamber to accommodate a through flow of fluid during operation of said coupling, means providing balancing chambers on the sides of said radial wall members remote from said working chamber, and means for maintaining fluid in said balancing chambers at substantially the same pressure as the fluid in said working chamber whereby said radial wall members are axially balanced during operation of said coupling.

2. The fluid coupling according to claim 1 wherein said means providing a divider ring comprises a pair of interfitting rings carried by the respective ends of said impeller blades and said turbine blades.

3. The fluid coupling according to claim 1 together with a throttle ring mounted for movement into and out of said working chamber to control the flow of fluid between said impeller blades and said turbine blades.

References Cited in the file of this patent
UNITED STATES PATENTS

| | | |
|---|---|---|
| 2,096,070 | Sinclair | Oct. 19, 1937 |
| 2,376,699 | Jandasek | May 22, 1945 |
| 2,628,509 | Pique | Feb. 17, 1953 |
| 2,670,823 | Thurber | Mar. 2, 1954 |
| 2,851,858 | Grosskopf | Sept. 16, 1958 |